(12) United States Patent
Prest et al.

(10) Patent No.: US 9,994,932 B2
(45) Date of Patent: Jun. 12, 2018

(54) AMORPHOUS ALLOY ROLL FORMING OF FEEDSTOCK OR COMPONENT PART

(75) Inventors: Christopher D. Prest, San Francisco, CA (US); Joseph C. Poole, San Francisco, CA (US); Joseph Stevick, Olympia, WA (US); Theodore A. Waniuk, Lake Forest, CA (US); Quoc Tran Pham, Anaheim, CA (US)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 14/387,044

(22) PCT Filed: Mar. 23, 2012

(86) PCT No.: PCT/US2012/030404
§ 371 (c)(1),
(2), (4) Date: Jun. 17, 2015

(87) PCT Pub. No.: WO2013/141882
PCT Pub. Date: Sep. 26, 2013

(65) Prior Publication Data
US 2015/0299824 A1    Oct. 22, 2015

(51) Int. Cl.
*C22C 1/02*    (2006.01)
*C22C 45/00*    (2006.01)
(Continued)

(52) U.S. Cl.
CPC .............. *C22C 1/002* (2013.01); *B21B 1/40* (2013.01); *B22F 3/18* (2013.01); *B32B 15/08* (2013.01);
(Continued)

(58) Field of Classification Search
None
See application file for complete search history.

(56) References Cited

U.S. PATENT DOCUMENTS 5,288,344 A    2/1994 Peker et al.
5,306,363 A *  4/1994 Masumoto .............. C22C 45/08
                                                          148/403
(Continued)

FOREIGN PATENT DOCUMENTS

CN    1486800    4/2004
CN    101490300   7/2009
(Continued)

OTHER PUBLICATIONS

International Search Report and Written Opinion, dated Nov. 15, 2012, PCT/ISA/210, PCT/ISA/220, PCT/ISA/237.
(Continued)

*Primary Examiner* — George Wyszomierski
(74) *Attorney, Agent, or Firm* — Brownstein Hyatt Farber Schreck, LLP

(57) ABSTRACT

Embodiments herein relate to a method of making roll formed objects of a bulk solidifying amorphous alloy comprising a metal alloy, and articles thereof. The roll forming includes forming a portion of the bulk solidifying amorphous alloy at a temperature greater than a glass transition temperature (Tg) of the metal alloy. The roll forming is done such that a time-temperature profile of the portion during the roll forming does not traverse through a region bounding a crystalline region of the metal alloy in a time-temperature-transformation (TTT) diagram of the metal alloy.

17 Claims, 4 Drawing Sheets

(51) Int. Cl.

| | |
|---|---|
| C22C 45/10 | (2006.01) |
| C22C 1/00 | (2006.01) |
| B22F 3/18 | (2006.01) |
| C22C 1/04 | (2006.01) |
| C22C 33/00 | (2006.01) |
| C22C 45/02 | (2006.01) |
| B21B 1/40 | (2006.01) |
| B32B 15/08 | (2006.01) |
| C21D 6/00 | (2006.01) |
| C22F 1/14 | (2006.01) |
| C22F 1/18 | (2006.01) |

(52) U.S. Cl.
CPC .............. *C21D 6/00* (2013.01); *C22C 1/04* (2013.01); *C22C 33/003* (2013.01); *C22C 45/001* (2013.01); *C22C 45/003* (2013.01); *C22C 45/02* (2013.01); *C22C 45/10* (2013.01); *C22F 1/14* (2013.01); *C22F 1/186* (2013.01); B32B 2250/40 (2013.01)

(56) References Cited

U.S. PATENT DOCUMENTS

| | | | |
|---|---|---|---|
| 5,368,659 A | 11/1994 | Peker et al. | |
| 5,423,969 A | 6/1995 | Masumoto et al. | |
| 5,618,359 A | 4/1997 | Lin et al. | |
| 5,735,975 A | 4/1998 | Lin et al. | |
| 6,325,868 B1 | 12/2001 | Kim et al. | |
| 7,540,929 B2 | 6/2009 | Demetriou et al. | |
| 7,575,040 B2 | 8/2009 | Johnson et al. | |
| 7,618,499 B2 | 11/2009 | Johnson et al. | |
| 7,806,997 B2 | 10/2010 | Demetriou et al. | |
| 7,883,592 B2 * | 2/2011 | Hofmann ................ | C22C 1/002 148/561 |
| 8,016,955 B2 | 9/2011 | Park et al. | |
| 8,066,827 B2 | 11/2011 | Demetriou et al. | |
| 8,336,355 B2 | 12/2012 | Koo et al. | |
| 8,361,250 B2 | 1/2013 | Demetriou et al. | |
| 8,480,864 B2 | 7/2013 | Farmer et al. | |
| 8,529,712 B2 | 9/2013 | Demetriou et al. | |
| 8,820,393 B2 * | 9/2014 | Prest ................... | B22D 11/01 164/463 |
| 9,095,890 B2 * | 8/2015 | Yamanaka ............. | A61L 31/022 |
| 2002/0100573 A1 * | 8/2002 | Inoue .................... | B21J 1/006 164/80 |
| 2009/0053476 A1 * | 2/2009 | Conner ................. | B32B 3/266 428/174 |
| 2016/0346819 A1 * | 12/2016 | Schroers ............... | C22C 1/002 |

FOREIGN PATENT DOCUMENTS

| | | |
|---|---|---|
| EP | 2042617 | 4/2009 |
| JP | S57211701 | 12/1982 |
| JP | 2001303218 | 10/2001 |
| JP | 2002204122 | 7/2002 |

OTHER PUBLICATIONS

A. L. Adenot-Engelvin et al., Microwave properites of ferromagnetic composites and metamaterials, ScienceDirect, Journal of the European Ceramic Society, vol. 27, Nos. 2-3, Nov. 19, 2006, pp. 1029-1033.

T.A.M. Aboki et al., "First investigations on twin-rolled $Zr_{59}Cu_{20}Al_{10}Ni_8Ti_3$ bulk amorphous alloy by mechanical spectroscopy", Material Science and Engineering, vol. 370, Nos. 1-2, Apr. 1, 2004, pp. 330-335.

Hwang K C et al., "Effect of thickness reduction on mechanical property and microstructure of Zr-based bulk metallic glass during warm-rolling in the supercooled liquid region", Intermetallics, Elsevier Science Publishers, vol. 18, No. 10, Oct. 1, 201, pp. 1912-1915.

Martinez et al., "Hot rolling of bulk metallic glass in its supercooled liquid region", Scripta Materialia, Elsevier, Amsterdam, NL, vol. 59, No. 2, Jul. 1, 2008, pp. 187-190.

Xiao X et al., "Effect of hot rolling on thermal stability and microstructure of $Zr_{52.5}Al_{10}Ni_{10}Cu_{15}Be_{12.5}$ bulk metallic glass", Materials Letters, North Holland Publishing Company, vol. 58, No. 19, Jul. 1, 2004, pp. 2357-2360.

Xue-Shan Xiao et al., "Effect of thermo-mechaical histories on the microstructure and properties of $Zr_{65}Al_{10}Ni_{10}Cu_{15}$ metallic glassy plates", Journal of Materials Science, Kluwer Academic Publishers, vol. 40, No. 20, Oct. 1, 2005, pp. 5435-5438.

Lee J G et al., "Continuous fabrication of bulk amorphous alloy sheets by twin-roll strip casting", Intermetallics, Elsevier Science Publishers, vol. 14, Nos. 8-9, Aug. 1, 2006, pp. 987-993.

Guo, "Ti-Based Alloys of Bulk Metallic Glasses and Nanostructure," Rare Metal Materials and Engineering, vol. 36, No. 5, May 2007, pp. 753-754.

Huang et al., "Progress and application of Zr-based amorphous alloys," *The Chinese Journal of Non-Ferrous Metals*, vol. 13, No. 6, Dec. 2003, pp. 1321-1322.

Inoue et al., "Bulk amorphous alloys with high mechanical strength and good soft magnetic properties in Fe—Tm—B (Tm=IV-VIII group transition metal) system," *Appl. Phys. Lett*, 1997, vol. 71, No. 4, pp. 464-466.

Shen et al., "Bulk Glassy $Co_{43}Fe_{20}Ta_{5.5}B_{31.5}$ Alloy with High Glass-Forming Ability and Good Soft Magnetic Properties," Materials Transactions, 2001 The Japan Institute of Metals, vol. 42, No. 10 p. 2136-2139.

* cited by examiner

AMORPHOUS ALLOY ROLL FORMING OF FEEDSTOCK OR COMPONENT PART

FIELD OF THE INVENTION

The present invention relates to bulk-solidifying amorphous metal alloy roll forming of feedstock or component part.

BACKGROUND

Roll forming, also spelled rollforming, is a continuous bending operation in which a long strip of sheet metal (typically coiled steel) is passed through sets of rolls mounted on consecutive stands, each set performing only an incremental part of the bend, until the desired cross-section profile is obtained. Roll forming is ideal for producing constant-profile parts with long lengths and in large quantities.

Sheet metal is simply metal formed into thin and flat pieces. It is one of the fundamental forms used in metalworking, and can be cut and bent into a variety of different shapes. Thicknesses can vary significantly, although extremely thin thicknesses are considered foil or leaf, and pieces thicker than 6 mm (0.25 in) are considered plate. There are many different metals that can be made into sheet metal, such as aluminum, brass, copper, steel, tin, nickel and titanium. Conventional sheet metals and alloys deform via the formation of dislocations, i.e., plastic work. For these conventional metals, sheet metal fabrication processes can mostly be placed into two categories—forming and cutting. Forming processes are those in which the applied force causes the material to plastically deform, but not to fail. So what one could be doing is one could be introducing plastic work into the alloy as one could form it into thinner and thinner sheets. So it is cold worked. Such processes are able to bend or stretch the sheet into the desired shape. Cutting processes are those in which the applied force causes the material to fail and separate, allowing the material to be cut or removed.

On the other hand, for a bulk-solidifying amorphous alloy (also referred to as bulk metallic glass (BMG)), the sheet forming processes of the conventional crystalline metals are generally not applicable as amorphous alloys do not deform by the formation of dislocations. They fail through the formation of shear bands, which are, in general, the sort of process that are not really desirable. Therefore, new methods for roll forming BMG feedstock are desirable.

SUMMARY

A proposed solution according to embodiments herein for roll forming of bulk-solidifying amorphous sheets is to heat them above the glass transition where they soften into an amorphous, yet somewhat fluid solid, and form them through a process such as thermoplastic forming or hot forming or various other things. In another embodiment, a molten bulk-solidifying amorphous alloy forming material could be molten in the vicinity of the rollers of the roll forming apparatus and rapidly cooled to form the BMG sheet.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
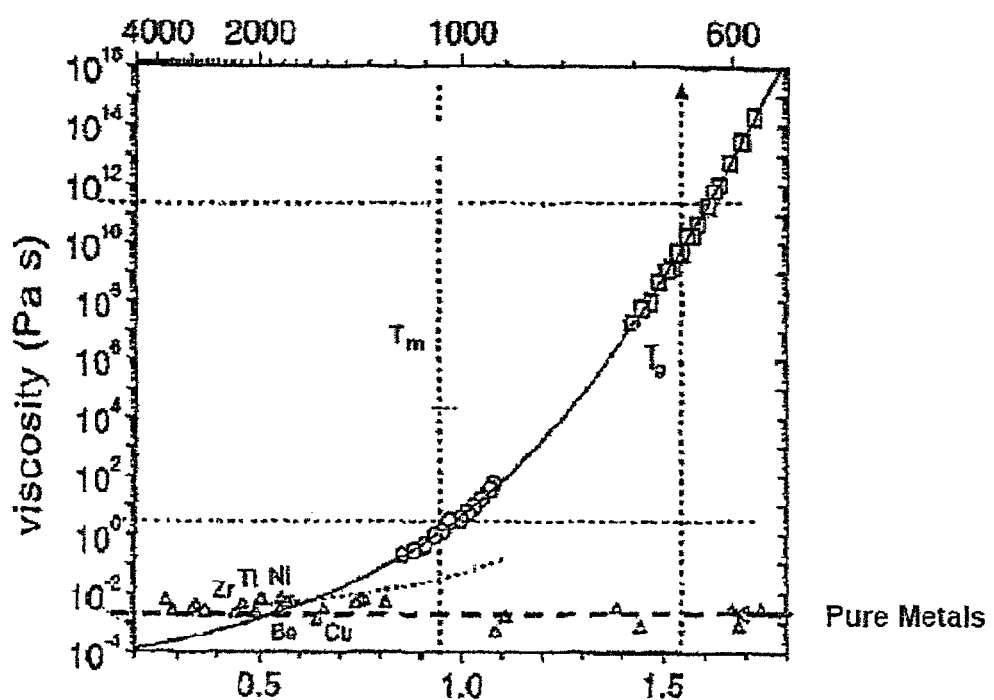
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
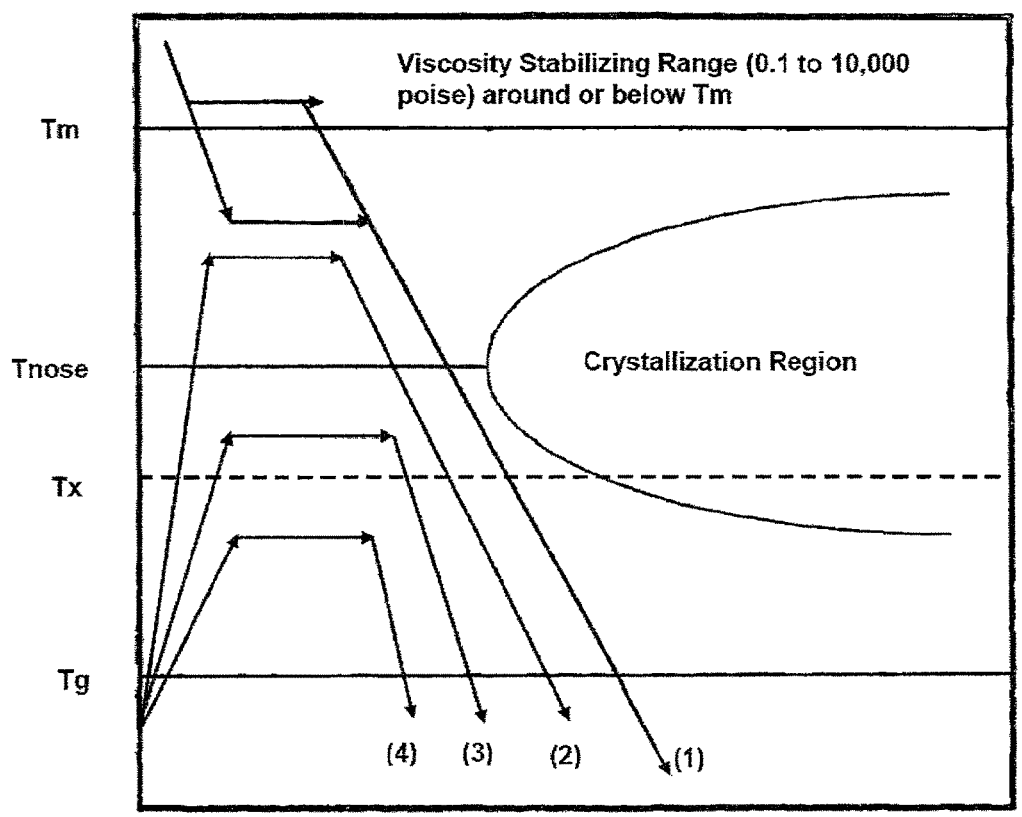
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substeantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the FYI curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x, x')=\langle(s(x),s(x')\rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions (atomic %)

| Alloy | Atm % | Atm % | Atm % | Atm % | Atm % | Atm % |
|---|---|---|---|---|---|---|
| 1 | Zr<br>41.20% | Ti<br>13.80% | Cu<br>12.50% | Ni<br>10.00% | Be<br>22.50% | |
| 2 | Zr<br>44.00% | Ti<br>11.00% | Cu<br>10.00% | Ni<br>10.00% | Be<br>25.00% | |
| 3 | Zr<br>0.5625 | Ti<br>0.1125 | Cu<br>0.0688 | Ni<br>0.0563 | Nb<br>7.50% | Be<br>12.50% |
| 4 | Zr<br>0.6475 | Ti<br>5.60% | Cu<br>14.90% | Ni<br>0.1115 | Al<br>2.60% | Be<br>1.00% |

TABLE 1-continued

Exemplary amorphous alloy compositions (atomic %)

| Alloy | Atm % | Atm % | Atm % | Atm % | Atm % | Atm % |
|---|---|---|---|---|---|---|
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 0.3623 | Ni 4.03% | Al 9.00% | | |
| 8 | Zr 0.4675 | Ti 8.25% | Cu 7.50% | Ni 10.00% | Be 27.50% | |
| 9 | Zr 0.2167 | Ti 0.4333 | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

TABLE 2

Additional exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe 68.00% | Mo 5.00% | Ni 5.00% | Cr 2.00% | P 12.50% | C 5.00% | B 2.50% | |
| 2 | Fe 68.00% | Mo 5.00% | Ni 5.00% | Cr 2.00% | P 11.00% | C 5.00% | B 2.50% | Si 1.50% |
| 3 | Pd 44.48% | Cu 32.35% | Co 4.05% | P 19.11% | | | | |
| 4 | Pd 77.50% | Ag 6.00% | Si 9.00% | P 7.50% | | | | |
| 5 | Pd 79.00% | Ag 3.50% | Si 9.50% | P 6.00% | Ge 2.00% | | | |
| 6 | Pt 74.70% | Cu 1.50% | Ag 0.30% | P 18.0% | B 4.00% | Si 1.50% | | |

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)—C—B, Co—Cr—Mo-Ln-C—B, Fe—Mn—Cr—Mo—(Y,Ln)—C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloy can also be one of the Pt- or Pd-based alloys described by U.S. Patent Application Publication Nos. 2008/0135136, 2009/0162629, and 2010/0230012. Exemplary compositions include Pd44.48Cu32.35Co4.05P19.11, Pd77.5Ag6Si9P7.5, and Pt74.7Cu1.5Ag0.3P18B4Si1.5.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the super-cooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Roll Forming Processes for BMG Sheet

In one embodiment, one could combine roll forming with an elevated temperature process for amorphous alloys, i.e., one could roll the bulk-solidifying amorphous alloy forming metals in the temperature regime between the glass transition and the onset of crystallization, i.e. the super cooled liquid region, to get fairly uniform sheets of bulk-solidified amorphous alloy provided one could cool them down rapidly after the process is completed, and one could not process them for a long period of time which could allow them to actually crystallize during the process. So one embodiment relates to roll forming using a thermoplastic forming operation.

Figure 3:
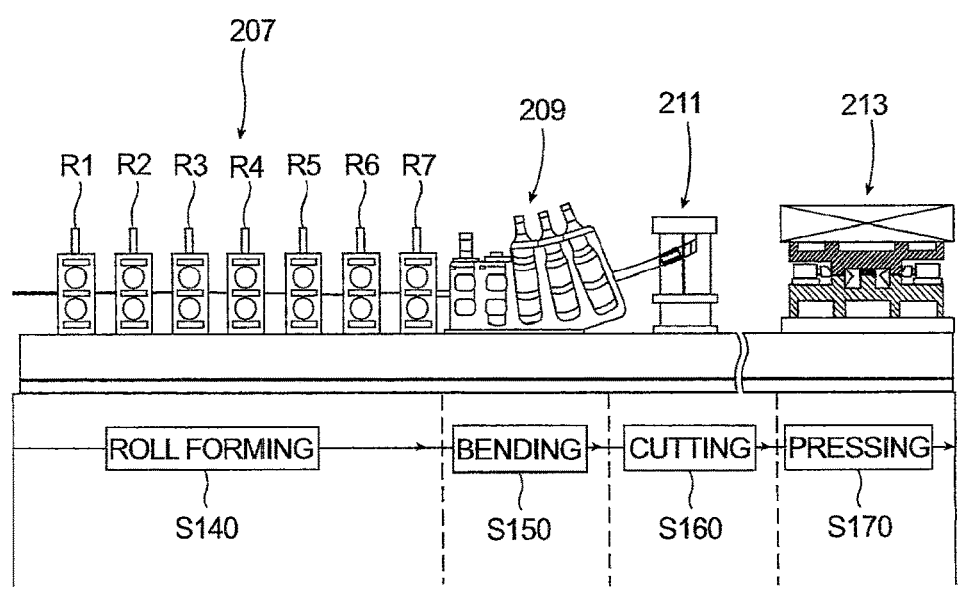
FIG. 3 provides a schematic of a roll forming system of the embodiments herein to make BMG sheets.

FIG. 3 (obtained from US Patent Pub. No. 2009/0165520) is a schematic of roll forming system that could be applicable for making the roll formed BMG sheet of the embodiments herein. The roll former unit 207 includes a plurality of roll formers (also referred to as rollers) R1, R2, R3, R4, R5, R6, and R7. The roll former unit 207 performs a roll-forming step S140 by sequentially bending the BMG sheet. Optionally, a round bender 209 including at least one of curvature-forming rolls could be provided at the exit end of the roll former unit 207 in the process line. In addition, a cutting press 211 for cutting the shaped BMG sheet could be provided to perform a cutting step S160. In addition, if a further thermoforming step S170 of the BMG sheet is required, then a hot press 213 can be provided.

In another embodiment, one could also use a molten alloy as a precursor. One could pour the molten alloy onto a set of spinning rollers and withdraw the sheet from the other end. In a manner analogous to conventional metal processing, but in the case of amorphous alloys the rate, one could cool during this forming process to generate an amorphous solid as the metal alloy exits the spinning rollers with a goal to form sheets that come out almost 100% amorphous.

In case of the above embodiment using a molten alloy as a precursor, one operates the roll former unit 207 shown in FIG. 3 in either the horizontal or vertical direction. Particularly, operating the roll former unit 207 in the vertical direction could be preferable as it would allow the molten alloy to pour down between the rollers under gravity.

In one embodiment, one could do thermo-forming and roll forming using rollers having uniform gap between rollers in order to generate a uniform thickness sheet. Alternatively, in a different embodiment is the rollers could be patterned with channels or other features which could separate the material into smaller units as it solidifies. For example, the rollers could have patterns on their surface such a waffle pattern, for example, having roughly rectangular or square indentations. Now, if one were to pour the molten alloy between those two rollers, then on the exit side of the rollers one could end up with either discrete units which match those depressions in the rollers or one could end up with a patterned sheet which could be primarily or completely amorphous.

One could also have a sequence of or a set of a flat roller and another roller with serrations or blades or something like that, and one could pour the molten amorphous alloy forming metal between the rollers. The molten alloy cools on the bottom roller and the top roller, which could have blade like protrusions that can separate the bulk solidified amorphous alloy as it cools into individual strips. An objective of doing this could be to produce feed stock for further operations or a final part if one could control the process properly.

One of the features of the embodiments herein is that the rollers have a precisely regulated temperature. The reason is that the properties of amorphous alloys are highly dependent on the cooling history. If one cools the molten amorphous alloy forming metal fast enough, one could get an amorphous solid. Slow cooling would form crystals in the material which has a detrimental effect on the mechanical properties. Regulated temperature means that one could want a roller to be at a temperature above room temperature, but not necessarily so high that the alloy could crystallize as it is passing through. So preferably the temperature of the rollers that forms the BMG sheet should be somewhere in the vicinity of 200 to 450 degree C., preferably for zirconium based alloys.

For example, one could take a molten alloy, which is overheated substantially, e.g. between 1000 to 1200 degree C., and one could pour it into a series of rollers which are maintained at a specific temperature above room temperature. In one embodiment, two rollers could be water cooled and held at room temperature. Alternatively, the two rollers could be held at an elevated temperature perhaps in the range of 200 to 450 degree C. In addition, one could use another set of rollers on the other side perhaps creating another set of operations which further refine the features on the material. For example, if one could take a molten amorphous alloy forming material and pour and pass it through cold rollers such that what emerges on the other side of the rollers has managed to avoid crystallization but is still at an elevated temperature and could be formed, then one could have an additional set of rollers which could provide additional changes to that sheet stock before it is cooled down to room temperature.

In the embodiments herein the molten amorphous alloy forming material could be poured between two moving molds which could provide the required cooling rate and also shaping operation necessary to produce final feed stock.

One could control the cooling so that in the end one could end up with a cooling rate of a 1,000 degree C. per second, and that cooling rate could be throughout the thickness of the sheet. However, for the some of the bulk amorphous alloys of the embodiments herein the cooling rates could in the range of 1 to 100 degree C. per second. So for these materials the cooling between these rollers could have to be such that the materials are cooled between 1 to 100 degrees C. per second in order to render them amorphous at the exit of the rollers. For the majority of the materials tested by the embodiments herein, the critical cooling rate could be in the range of 1 to 10 degrees C. per second. Therefore, for these materials, one could more easily control the cooling of the bulk solidifying amorphous alloy forming materials to form bulk solidifying amorphous alloys.

The cooling rate can be tuned as per the critical cooling rate requirements of the alloys. The cooling rate is modified by the difference between the temperature of the molten material forming the bulk solidifying amorphous alloy and the temperature of the roller. So by controlling the temperature of the roller to some temperature below, for example, 200 to 500 degree C., one could essentially tune the cooling rate. For those alloys which are more robust, one could obtain fully amorphous parts with slower cooling rates than for those alloys that require cooling at around 100 degree C. per second. For the more robust materials, direct water cooling would be sufficient.

The thickness range of the bulk-solidifying amorphous alloy sheets made the roll forming processes of the embodiments herein can be in the millimeter range to something on the order of ½ inch thickness or approximately 10 to 15 millimeters in thickness. At the thin end, the thickness could be 0.3 to 0.5 millimeter, i.e., 300-500 microns, or something of that order.

One of the variations one could have is where one can have a cooling system built within the rollers. The other variation could be that the roller material is electromagnetically transparent so one could use induction heating for localized induction heating close to the tip or above the tip where the two rollers meet so that the bulk solidifying amorphous alloy forming materials basically melt just prior to entry into the rollers, and soon quickly thereafter could be squeeze between the rollers. After squeezing the bulk solidifying amorphous alloy, one could cool the bulk solidifying amorphous alloy to form the bulk solidifying amorphous alloy sheet below. In one embodiment, the cooling of the molten bulk solidifying amorphous alloy could be done by cooling the rollers themselves using cooling coils or channels that run through the rollers. So if one could look at a cross section of two rollers, a left roller and a right roller, the two rollers could touch each other at the three o'clock position of the left roller and the nine o'clock position of the right roller. One could have an induction heating system whereby induction heating the bulk solidifying amorphous, which could be in a powder or granular form, to a molten form at the two o'clock position of the left roller and the ten o'clock position of the right roller. Then, the material could be squeezed between the rollers at the three o'clock position of the left roller and the nine o'clock position of the right roller. Then, as the material exits the squeezing point it could pass the four o'clock position of the left roller and the 8 o'clock position of the right roller, at which point one could start rapidly quenching the material to form the bulk solidifying amorphous alloy sheet. For a continuous process the rollers may be at 'constant' temperature. Optionally, one may add a second set of rollers for quenching.

Another embodiment would be to combine roll forming with a cold hearth heating and melting systems for melting the bulk solidifying amorphous alloy forming materials. For example, one could have two rollers which form the base of a crucible, and one could melt a material on top of them. Furthermore, these rollers could be water cooled continuously. The material could be heated up by the induction heating, for example. The material itself would sit on top of the two rollers forming the base of the crucible without wetting the rollers because the surface tension of the molten alloy will tend to pull it up. As soon as one has the material at the desired temperature, for example the melting temperature, one would simply turn on the rollers and the material would flow between the rollers and come out the exit side of the rollers.

In another embodiment of the invention, a temperature regulated copper crucible (base or hearth), which is continuously water cooled, is used. The metal alloy could be melted either inductively or with an arc or a plasma or an electron beam, for example. Because the copper base is temperature regulated at temperature that is much lower than melting temperature of the alloy, the molten alloy would not wet the base. Because the metal alloy does not wet the base, it is essentially processed containerlessly. The material sitting on the base is a slurry or partially crystalline. Instead of a crucible shaped like a boat, the crucible in the embodiments herein could have the base as the two rollers (crucible forming rollers) with very close spacing, or as close as desired. On top of the base formed by the crucible forming rollers is a section to contain the metal alloy that forms the bulk-solidifying amorphous alloy. The crucible forming rollers could be made of electromagnetically transparent material such as a ceramic. The crucible forming rollers could be water cooled. The material would sit on top of those water cooled crucible forming rollers and basically settle down in the space between the rollers. An induction coil would heat the material on top of the water cooled crucible forming rollers, but because they are cooled, the metal alloy will not stick to these crucible forming rollers. As soon as power is turned off, and the rollers are actuated, the molten material will get pulled through the rollers very rapidly forming a sheet on the other side. Optionally one could use a copper base crucible, and tilt the crucible to pour molten alloy onto the roller.

Also another embodiment relates to using two set of rollers where the first set of rollers acts like the crucible forming rollers, preferably made out of electromagnetically transparent material with induction heating, etc.

In one embodiment, one can constantly a feed powder feedstock of the bulk solidifying amorphous alloy forming material in the crucible forming rollers that forms a melt pool above the crucible forming rollers. The powder material would be melted in the melt pool, and would come out from the exit side of the crucible forming rollers as a molten sheet. As it comes out of the crucible forming rollers as a molten sheet it would get processed through a second set of rollers (cooling rollers) which are chilled rollers and those chilled rollers would quench the sheet and one would end up with an amorphous sheet. Thus, according to this embodiment, one would have two sets of rollers—crucible forming rollers and cooling rollers. One would be constantly pouring powder feedstock of the bulk solidifying amorphous alloy forming material powder material in between the gap between the crucible forming rollers. The crucible forming rollers that would be receiving the powder feedstock material between would be inductively heated such that what comes out at the exit end of the crucible forming rollers would be a molten alloy of the bulk solidifying amorphous alloy. Right below the crucible forming rollers would be the second set of rollers, which are the cooling rollers, and the cooling rollers would be chilled such that the molten metal alloy is quenched as soon as it goes through the cooling rollers.

In yet another embodiment, one could form a laminate of bulk solidifying amorphous alloy. In yet another embodiment, one could form a laminate of bulk solidifying amorphous alloy and a thermoplastic polymer. For example, see FIG. 4, where the material supplied on spools could be just bulk solidifying amorphous alloy sheets or a combination of bulk solidifying amorphous alloy sheets and thermoplastic polymer sheets. For example, in FIG. 4, the top, middle and bottom spools could contain bulk amorphous alloy sheets while the two intermediate spools could contain thermoplastic polymer sheets, thereby forming a laminate of structure B/P/B/P/B where B stand for bulk solidifying amorphous alloy and P stands for thermoplastic polymer. The thermoplastic polymer could be any thermoplastic that can be thermo-plastically processed in the superplastic temperature range of the bulk solidifying amorphous alloy. For example, the thermoplastic polymer could be polyetheretherketone (PEEK), polyethersulfone (PES), or polyesters, among others.

Figure 4:
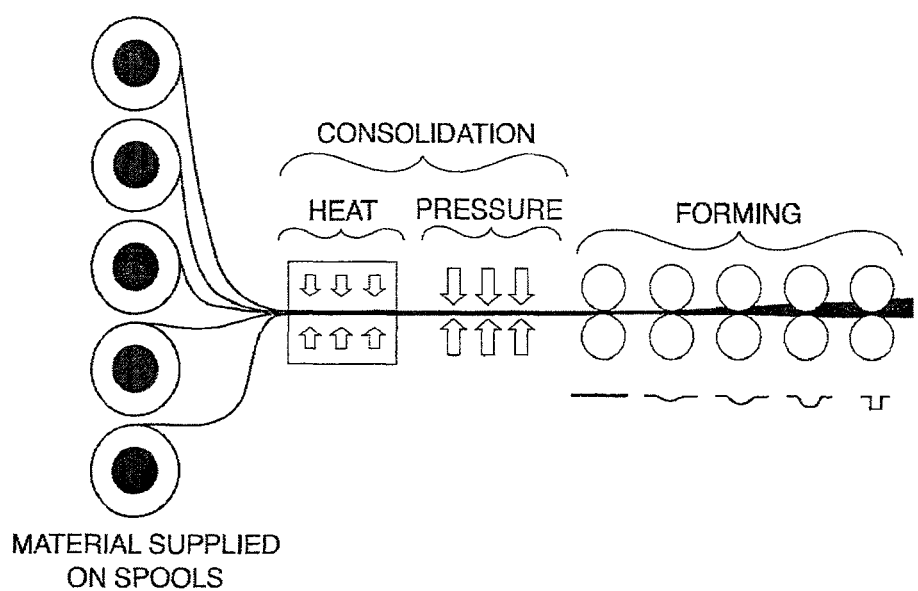
FIG. 4 provides a schematic of a schematic of a roll forming system of the embodiments herein to make laminated BMG sheets.

The roll forming process of FIG. 4 can be considered as having four parts: (1) material supply, (2) heating, (3) consolidation and (4) the forming operation. The material could be supplied on one or more coils. The actual form of the material may vary depending on the laminate required. It is also possible to feed fibers such as thermoplastic polymer fibers, carbon or Kevlar fiber reinforcement, or fiber-reinforced sheet like material such as a braided sheet. Consolidation may be performed using a variety of methods including a double belt press or a series of compression rollers.

In yet another embodiment, the process could be performed in open air for precious metal amorphous alloy (Au, Ag, Pd, Pt based alloy); however, other alloy such as the Zr or Ti based amorphous alloys require to be processed under vacuum or inert atmosphere.

What is claimed:

1. A method comprising:
melting a feedstock of a bulk solidifying amorphous alloy, thereby forming a molten material;
introducing the molten material into a first roll former;
cooling the molten material to a temperature between a crystallization temperature (Tx) and a glass transition temperature (Tg) of the bulk solidifying amorphous alloy, thereby forming an amorphous material; and
while the amorphous material is between Tx and Tg, roll forming, with a second roll former, the amorphous material such that a time-temperature profile of the amorphous material during the roll forming does not traverse through a region bounding a crystalline region of the bulk solidifying amorphous alloy in a time-temperature-transformation (TTT) diagram of the bulk solidifying amorphous alloy.

2. The method of claim 1, further comprising maintaining a set of rollers of the first roll former between 200° C. and 450° C., wherein the operation of cooling the molten material to the temperature between Tx and Tg comprises passing the molten material through the set of rollers.

3. The method of claim 1, wherein the operation of cooling the molten material to the temperature between Tx and Tg comprises passing the molten material through a set of cooled rollers.

4. The method of claim 1, further comprising introducing the feedstock into a crucible having a bottom surface defined by a set of rollers of the first roll former.

5. The method of claim 4, wherein the operation of melting the feedstock comprises heating the feedstock to form a pool of the molten material by inductive heating.

6. The method of claim 5, wherein the set of rollers is electromagnetically transparent.

7. The method of claim 5, wherein the operation of heating the feedstock comprises heating only a portion of the feedstock that is adjacent a gap between the set of rollers.

8. The method of claim 1, wherein the bulk solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

9. The method of claim 1, wherein the bulk solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

10. The method of claim 1, wherein the operation of melting the feedstock comprises heating the feedstock to or above a melting point of the bulk solidifying amorphous alloy, wherein the feedstock is a powder.

11. A method comprising:
introducing a molten bulk solidifying amorphous alloy into a first roll former, the bulk solidifying amorphous alloy having a crystallization temperature (Tx) and a glass transition temperature (Tg);
cooling the molten bulk solidifying amorphous alloy to a temperature between Tx and Tg in the first roll former, thereby forming the bulk solidifying amorphous alloy;
feeding the bulk solidifying amorphous alloy from the first roll former to a second roll former; and
roll forming the bulk solidifying amorphous alloy with the second roll former while the bulk solidifying amorphous alloy is between Tx and Tg.

12. The method of claim 11, wherein the bulk solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

13. The method of claim 12 further comprising maintaining a set of rollers of the second roll former between 200° C. and 450° C.

14. The method of claim 11, wherein a cooling rate between the set of rollers of the first roll former is from 1° C. to 100° C. per second throughout a thickness of the bulk solidifying amorphous alloy.

15. The method of claim 11, wherein the bulk solidifying amorphous alloy has an amorphous content of at least 80% by volume.

16. A method comprising:
introducing a molten bulk solidifying amorphous alloy into a roll former comprising a set of rollers including a pattern on a surface of the set of rollers;
separating the bulk solidifying amorphous alloy into a plurality of strips while the bulk solidifying amorphous alloy is passed through the roll former, and
cooling the molten bulk solidifying amorphous alloy to produce a bulk solidifying amorphous alloy in the roll former, the molten bulk solidifying alloy being cooled to a temperature between a crystallization temperature (Tx) and a glass transition temperature (Tg) of the bulk solidifying amorphous alloy.

17. The method of claim 16, wherein the pattern comprises protrusions on the surface of the set of rollers.

* * * * *